United States Patent [19]
Mitarai et al.

[11] Patent Number: 5,459,369
[45] Date of Patent: Oct. 17, 1995

[54] CONTROL APPARATUS FOR TRAVELLING WAVE DRIVEN MOTOR

[75] Inventors: Reiji Mitarai, Hachioji; Hiroaki Takeishi, Yokohama, both of Japan

[73] Assignee: Canon Kabushiki Kaisha, Tokyo, Japan

[21] Appl. No.: 93,852

[22] Filed: Jul. 20, 1993

[30] Foreign Application Priority Data

Jul. 20, 1992 [JP] Japan .................... 4-192397

[51] Int. Cl.⁶ .......................................... H02N 2/00
[52] U.S. Cl. ................................................. 310/317
[58] Field of Search ........................... 310/316, 317; 318/116

[56] References Cited

U.S. PATENT DOCUMENTS

| | | | |
|---|---|---|---|
| 5,013,982 | 5/1991 | Sasaki | 318/116 |
| 5,053,669 | 10/1991 | Saeki et al. | 310/323 |
| 5,061,882 | 10/1991 | Takagi | 318/116 |
| 5,162,708 | 11/1992 | Naito et al. | 318/116 |
| 5,165,047 | 11/1992 | Shimizu | 318/116 |
| 5,214,339 | 5/1993 | Naito | 310/316 |

*Primary Examiner*—Thomas M. Dougherty
*Attorney, Agent, or Firm*—Fitzpatrick, Cella, Harper & Scinto

[57] ABSTRACT

In a travelling wave driven motor and its driving apparatus, the absolute value of a speed is controlled using a vibration amplitude value as a main manipulation variable. A plurality of frequencies are selectively generated as sub manipulation variables, and are used as the driving frequencies of the motor. In a precision positioning operation (precision operation mode), an electric signal, which has a first selected frequency separated by a predetermined value from a resonance point of a stator of the motor, and has a predetermined amplitude value, is supplied to a piezoelectric element. In a high-speed feed operation (coarse operation mode), an electric signal, which has a second selected frequency near the resonance point of the stator, and has a predetermined amplitude value, is supplied to the piezoelectric element.

4 Claims, 2 Drawing Sheets

CONTROL APPARATUS FOR TRAVELLING WAVE DRIVEN MOTOR

BACKGROUND OF THE INVENTION

1. Field of the Invention

The present invention relates to a control technique for performing positioning using a travelling wave driven motor and, more particularly, to a control technique suitable for use in a precision operation mechanism for positioning with a precision on the order of microns or less, such as a semiconductor manufacturing process or an optical system adjustment actuator, and which can achieve high-speed movement within a large operation range, with high precision positioning.

2. Related Background Art

FIG. 2 shows a typical prior art configuration. The arrangement shown in FIG. 2 will be described below. Two phases of frequency powers are supplied to the main body 1 of a known ultrasonic motor (to be abbreviated as USM hereinafter) as outputs from power amplifiers 3. Two phase signals are generated by a known voltage controlled oscillator (to be abbreviated as VCO hereinafter) 5 and a phase shifter 4. The VCO 5 generates a frequency signal having a driving frequency $f_d$, and the phase shifter 4 selectively outputs two phase signals having a phase difference of 0°, and selectively 90° or −90°. The ±90° signals correspond to forward and reverse rotations of the USM main body 1. One of the ±90° signals is selected by a switch 7, and is input to the USM main body 1. A CPU 6 calculates and outputs a frequency command to be supplied to the VCO 5 on the basis of a detect signal from a speed detector 2 attached to the USM main body 1.

In this manner, the stator vibration frequency $f_d$ is used as a manipulated variable (in this case, a value for manipulating a speed as a control variable), and this system has a basic principle of controlling the motor speed by changing this value.

The static relationship between the motor speed and the driving frequency is represented by an asymmetric curve shown in FIG. 3. In an illustrated region, unimodal characteristics are exhibited, and correspond to resonance characteristics of a stator consisting of an elastic member. A frequency range used in speed control is a right slope, having a relatively small gradient, of the curve, i.e., a region at the high-frequency side of the resonance frequency. However, as will be described below, of these characteristics, information utilized for control is only the fact that the right slope curve is monotonous.

As a typical speed control method by the CPU 6, the following method is known. Based on a speed set value $v_r$ and a detect speed $v$, the driving frequency $f_d$ is changed according to the following relationship:

$$f_d = \begin{cases} f_d - \Delta f & \text{for } (v_r - v > 0) \\ f_d + \Delta f & \text{for } (v_r - v < 0) \end{cases} \quad (1)$$

where $\Delta f$ is amount the driving frequency is changed per calculation.

The prior art technique depends on speed control. FIG. 2 does not illustrate position control.

Position control is an additional feature, and is achieved by adding a method of stopping a driving signal when a set position is reached to a calculation of the CPU 6. In this system, since a driving operation until the motor is stopped is a unidirectional operation, if the motor overshoots a set position, the forward/reverse rotation switch 7 is switched to operate the motor in the reverse direction.

In the fundamental technique of the above-mentioned prior art, the operation speed is adjusted by operating the driving frequency. For this reason, it is impossible to achieve closed-loop control as well as to continuously switch between forward and reverse rotations. Manipulation of the driving frequency inevitably leads to nonlinear transfer characteristics, and various effective feedback control techniques cannot be utilized. Therefore, the above system suffers from limited performance.

Since the driving frequency is always changed, a problem of unsteadiness cannot be ignored as well as the nonlinear characteristics. A travelling wave driven motor tends to excite various modes which are not associated with the driving force since it utilizes vibration characteristics of an elastic member, and all these modes generate disturbance vibrations. Originally, a coherent vibration system based on a constant frequency is desirable. A major cause of unsteadiness that cannot obtain fixed characteristics is the above-mentioned driving method of the prior art.

For the above-mentioned reasons, it is difficult for the prior art to reliably and precisely adjust the motion of a motor.

It is an object of the present invention to provide a control apparatus for a travelling wave driven motor which can stably operate an ultrasonic motor or a vibration wave driven motor at a low speed.

Other objects of the present invention will become apparent from the following detailed description of the invention.

SUMMARY OF THE INVENTION

According to one aspect of the present invention, in a travelling wave driven motor and its driving apparatus, the absolute value of a speed is controlled using a vibration amplitude value as a main manipulated variable. Furthermore, a plurality of frequencies are selectively generated as sub-manipulated variables, and are used as the driving frequencies of the motor. In a precision positioning operation (precision operation mode), an electric signal, which has a first selected frequency separated by a predetermined value from a resonance point of a stator of the motor, and has a predetermined amplitude value, is supplied to a piezoelectric element. In a high-speed feed operation (coarse operation mode), an electric signal, which has a second selected frequency near the resonance point of the stator, and has a predetermined amplitude value, is supplied to the piezoelectric element.

BRIEF DESCRIPTION OF THE DRAWINGS

FIGS. 1A and 1B show an embodiment of the present invention, in which FIG. 1A is a block diagram showing the entire control apparatus, and FIG. 1B is a block diagram showing blocks for the purpose of easily understanding the functions of a CPU;

DESCRIPTION OF THE PREFERRED EMBODIMENTS

Figure 1A:
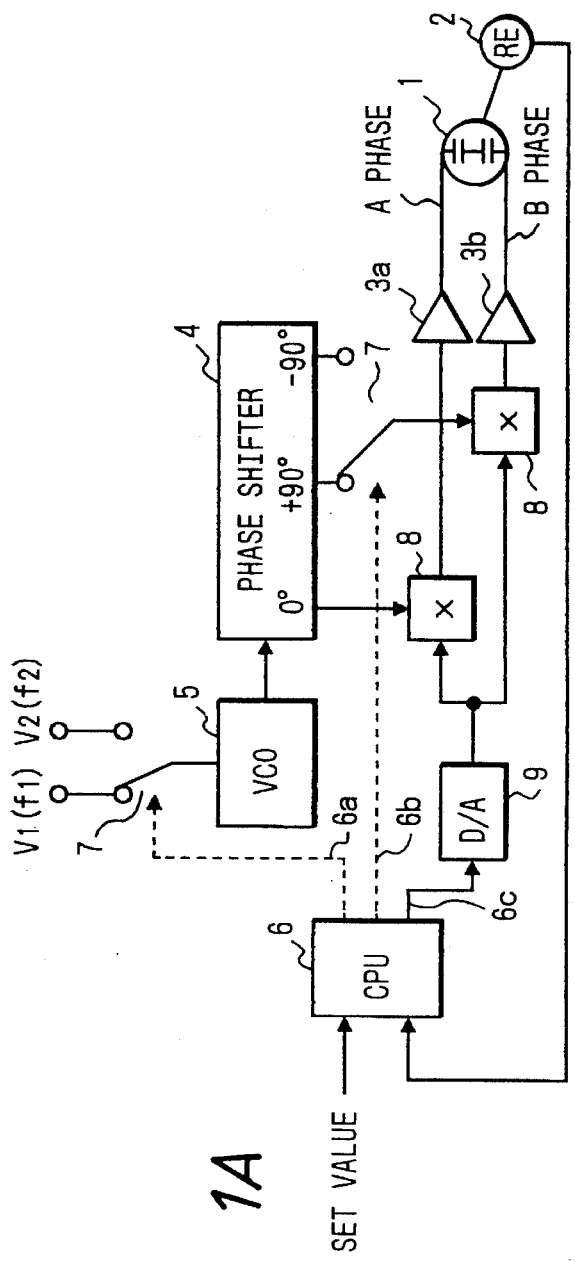
Figure 1B:
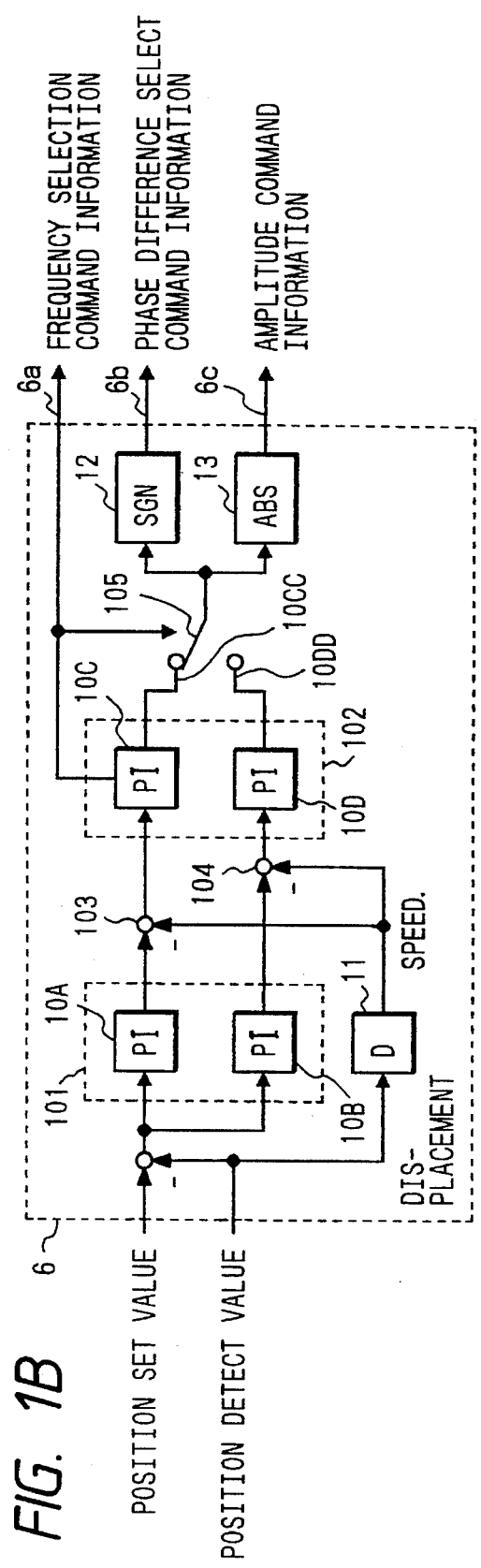
Figure 2:
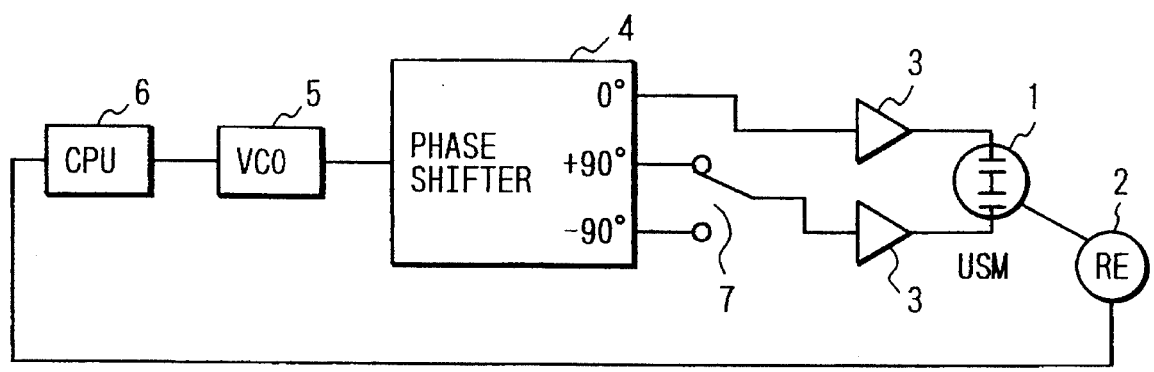
FIG. 2 is a schematic diagram showing a typical basic principle of the prior art.

FIGS. 1A and 1B show an embodiment of the present invention. Characteristic features as compared to the arrangement of the prior art (see FIG. 2) will be mainly described below.

Referring to FIG. 1A, a frequency signal having a predetermined reference amplitude as an output from a phase shifter 4 is multiplied with a desired amplitude value by a known analog multiplier (rate multiplier) 8. This amplitude value (multiplier) is calculated by a CPU 6, and is converted into an analog signal by a digital-to-analog converter (DAC) 9. The analog signal is then supplied to the rate multiplier 8. The analog signal representing the amplitude value is a main manipulated variable having the meaning of a feedback control adjustment amount. On the other hand, in a VCO 5 as an oscillator, a plurality of frequency command voltages $V_1$ and $V_2$ are provided, and respectively correspond to the frequencies of electric signals to be supplied to an ultrasonic motor. FIG. 1A illustrates only two voltages $V_1$ and $V_2$. However, if three or more voltages are used, the same basic principle can be applied.

A calculation function of the CPU 6 will be mainly described below with reference to FIG. 1B. The CPU 6 receives a position set value (target value) and a position detect value output from a speed detector 2, and outputs three different signals, i.e., amplitude command information 6c as a main manipulated variable, and phase difference select command information 6b and frequency selection command information 6a as two sub manipulated variables. The digital calculation arrangement of the CPU 6 adopts a basic arrangement consisting of speed loop compensation and position loop compensation, which can utilize design parameter setting means for a feedback control of an electromagnetic motor.

A comparison signal between the position set value and the position detect value as inputs is treated by a block 101 including PI (proportional + integral) calculators 10A and 10B as a position loop compensation block, and is then transferred to a speed compensation block 102. The speed is calculated by a derivative calculator 11 on the basis of the position detect value. This embodiment is described under a condition that the position detect value is a displacement. However, if the position detect value is a speed, the speed is directly output, or a displacement amount is calculated by an integral calculation. The position loop compensation calculation output value and the speed are compared with each other by a comparator 103, and thereafter, the block 102 including PI calculators 10C and 10D performs speed loop compensation. The speed loop compensation output values (10CC and 10DD) are input to a sign function unit 12 and an absolute value function unit 13, and are output from the CPU 6 as the phase difference select command information 6b and the amplitude command information 6c. In this embodiment, all compensation calculations are represented by PI calculations, but normally include PID (proportional +integral + derivative) calculations together with a derivative calculation or may include P (proportional) or PD (proportional + derivative).

The two systems of loop compensation are described, and parameters are set in correspondence with either a precision operation mode or a coarse operation mode. An integral variable in speed loop compensation calculators in a precision operation mode system (i.e., a system of the elements 10A, 103, and 10C) is monitored in each control calculation cycle, and its absolute value is limited by a predetermined upper limited value. If it is detected that the absolute value of the integral variable is saturated, the CPU 6 generates a signal for selecting the coarse operation mode, and outputs the signal therefrom. At the same time, the CPU 6 switches its own control calculation system to the coarse operation mode system (i.e., a system of the elements 10B, 104, and 10D). Conversely, when saturation of the integral variable is canceled, the control calculation system is restored to the precision operation mode.

The operation of the driving control apparatus of the ultrasonic motor according to the present invention will be described in more detail below.

Figure 3:
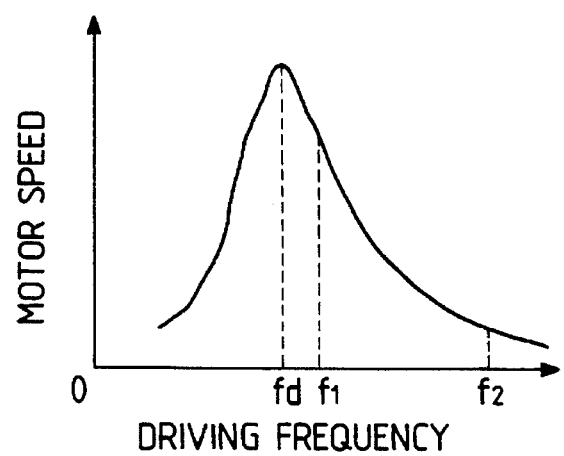
FIG. 3 is a graph showing the relationship between the motor speed and the driving frequency.

When a target value (position set value) input to the CPU 6, i.e., the set moving amount of the main body (i.e., rotor) of the known motor 1 consisting of a vibrating member forming a stator and the rotor, is large, the frequency selection command information output from the PI calculators 10B and 10D serves as information for selecting $V_1$ as a voltage to be input to the VCO 5. When the voltage $V_1$ is input to the VCO 5, an alternating signal having a frequency $f_1$ (see FIG. 3) near the resonance frequency $f_d$ (see FIG. 3) of the stator of the motor and at the high-frequency side is supplied to a known piezoelectric element fixed to the above-mentioned vibrating member. In this case, since the input terminal of the rate multiplier 8 receives amplitude command information from the CPU 6 via the DAC 9, an A phase alternating signal to be output from a power amplifier 3a becomes a signal having the frequency $f_1$ and a large amplitude. Furthermore, a B phase alternating signal to be output from a power amplifier 3b also becomes a signal having the frequency $f_1$ and the same amplitude as that of the A phase alternating signal. Note that the phase of the B phase signal is shifted by 90° from that of the A phase signal by the shifter 4. The rotor of the ultrasonic motor or vibration driven motor 1 begins to move at a high speed, and approaches the target value at a high speed. Note that this operation will be referred to as a coarse operation mode hereinafter.

When the rotor reaches a value near the target value, the frequency selection command information 6a from the CPU 6 switches the switch 7 in response to a signal from the detector 2 interlocked with the rotor, so that a voltage $V_2$ is applied to the VCO 5. Therefore, the A and B phase electric signals to be output from the power amplifiers 3a and 3b have a frequency $f_2$ (see FIG. 3) corresponding to the voltage $V_2$. When the content of the frequency selection command information is changed to the above-mentioned information, since a selection switch 105 is also switched to the PI calculator 10C side, the amplitude command information 6c is changed as well, and the amplitudes of the electric signals become smaller than that of the signal having the frequency $f_1$. More specifically, when the rotor reaches a value near the target value, the operation mode of the motor is switched from the coarse operation mode to the precision operation mode. In this mode, the motor approaches the target value at a low speed, and is precisely stopped at the target value.

On the other hand, when the target value is smaller than a predetermined value, since the PI calculator 10C is not saturated, the operation is started in the precision operation mode from the beginning, and the motor is precisely stopped at the target value.

[Another Embodiment]

If fine details are specialized or partially changed, many other embodiments may be obtained. However, the basic technical principle has been thoroughly expressed in the above embodiment. An embodiment wherein a use method is different from the above-mentioned industrial field will be described below, although the circuit arrangement to achieve this method is not shown since it is easily achieved.

The frequency selection command generation method by the CPU is one of several important points of the present invention. For example, an embodiment which substitutes for the frequency selection command with an external signal, e.g., a manual operation, may be presented. In this case, the control apparatus of the present invention can be utilized in two industrial fields, i.e., a field requiring precision alone, and a field requiring a high-speed large-stroke operation, although it is a coarse operation. As will be apparent from the above description, it is an advantage that the motor can be utilized in two extreme fields by switching an external switch of a travelling wave driven motor control apparatus.

According to the present invention, ultra high-precision positioning feedback control can be realized by selecting a driving frequency allowing a low-speed stable operation. When the moving range is large, since the resonance frequency or a frequency near the resonance frequency is selected, the motor can be moved at the upper-limit speed of the travelling wave driven motor. Therefore, a travelling wave driven motor control apparatus which can realize a servo actuator having both high precision and wide dynamic range characteristics can be provided.

What is claimed is:

1. A vibration driven actuator comprising:

a vibration member;

an electro-mechanical energy conversion element provided on said vibrating member;

a frequency signal generating circuit for applying a frequency signal to the energy conversion element, said circuit having a first operation mode for generating a frequency signal having a first frequency and a first voltage amplitude, and having a second operation mode for generating a frequency signal having a second frequency higher than the first frequency and a second voltage amplitude smaller than the first amplitude; and a selection circuit for selecting one of the first and second operation modes of said frequency signal generating circuit.

2. A vibration driven actuator according to claim 1, further comprising determination means for receiving a position set value representing a target position, for receiving a position detect value representing an actual position, and for determining a difference between said values, wherein said selection circuit is responsive to said determination means and selects the first operation mode when the difference between a target position and an actual position is large, and selects the second mode when the difference is small.

3. A vibration driven actuator comprising:

a vibrating member;

an electro-mechanical energy conversion element provided on said vibrating member;

a frequency signal generating circuit for applying a frequency signal to said energy conversion element, said circuit having a first setting circuit for setting a frequency of the frequency signal either at a first frequency or a second frequency higher than the first frequency, and having a second setting circuit for setting a voltage amplitude of the frequency signal to a first voltage amplitude or to a second voltage amplitude smaller than the first voltage amplitude; and a switching circuit for switching the second setting circuit to the first voltage amplitude when the first setting circuit sets the frequency of the frequency signal to the first frequency, and for switching the second setting circuit to the second voltage amplitude when the first setting circuit sets the frequency of the frequency signal to the second frequency.

4. A vibration driven actuator according to claim 3, wherein said switching circuit switches a setting state of the first setting circuit and the second setting circuit in accordance with an operation state of the actuator of said switching circuit.

* * * * *

UNITED STATES PATENT AND TRADEMARK OFFICE
CERTIFICATE OF CORRECTION

PATENT NO. : 5,459,369
DATED : October 17, 1995
INVENTOR(S) : REIJI MITARAI, ET AL.

It is certified that error appears in the above-indentified patent and that said Letters Patent is hereby corrected as shown below:

COLUMN 1

Line 28, "and selectively" should be deleted.

COLUMN 4

Line 12, "$V_t$" should read --$V_1$--.

COLUMN 5

Line 5, "apparatus-of" should read --apparatus of--.

Signed and Sealed this

Nineteenth Day of March, 1996

Attest:

BRUCE LEHMAN

Attesting Officer          Commissioner of Patents and Trademarks